United States Patent [19]

Arnegger

[11] Patent Number: 4,489,724
[45] Date of Patent: Dec. 25, 1984

[54] DEVICE FOR LONGITUDINALLY DRIVING A TOOL

[76] Inventor: Richard E. Arnegger, Im Schooren, 8713 Uerikon ZH, Switzerland

[21] Appl. No.: 483,128

[22] Filed: Apr. 8, 1983

Related U.S. Application Data

[63] Continuation of Ser. No. 234,156, Feb. 13, 1981, abandoned.

[30] Foreign Application Priority Data

Feb. 13, 1980 [CH] Switzerland ........................ 1152/80

[51] Int. Cl.³ .............................................. A61B 17/14
[52] U.S. Cl. .................. 128/303 R; 128/317; 30/394
[58] Field of Search ............... 128/317, 92 E, 303 R; 30/392, 216, 393, 394, 217–220; 74/49, 50, 598, 597

[56] References Cited

U.S. PATENT DOCUMENTS

| | | | |
|---|---|---|---|
| 2,735,314 | 2/1956 | Meile | 74/598 |
| 2,775,128 | 12/1956 | Young | 74/49 |
| 3,978,862 | 9/1976 | Morrison | 128/317 |

FOREIGN PATENT DOCUMENTS 1455566 11/1976 United Kingdom ................ 128/317

Primary Examiner—Michael H. Thaler
Attorney, Agent, or Firm—Donald D. Denton

[57] ABSTRACT

The present invention relates to a manual tool device, preferably used for surgical operations on bones, of longitudinal shape and to a method for making the same, the device assembly and arrangement, in particular the gearing section by which the driving force of an electrical motor is operatively transmitted to the tool through a gearing mechanism, and the weight of the device provides a well balanced device that is easy to work with in a highly precise manner. The method to produce the manual device represents a simple and rational way of manufacture.

10 Claims, 3 Drawing Figures

DEVICE FOR LONGITUDINALLY DRIVING A TOOL

This is a continuation of application Ser. No. 234,156 filed Feb. 13, 1981, now abandoned.

BACKGROUND OF THE INVENTION

The present invention relates to a manual device of longitudinal shape and an outer surface of cylindrical cross section with a tool movable parallel to the longitudinal axis of this device, an electrical motor with a drive shaft and a gear section arranged between the tool and the drive shaft.

There are known different kinds of devices which are driven by a motor, and held and guided by hand. If, as in the present case, one has to do with a tool for which under all circumstances an accurate guidance must be possible, it is essential that the device is handy. For example, such a device is disclosed in U.S. patent application Ser. No. 966,578 filed Dec. 5, 1978, entitled "Hand Tool."

The other closest prior art known to the invention is in U.S. Pat. No. 3,978,862 and British Pat. No. 1,455,566.

SUMMARY OF THE INVENTION

The invention is characterized in that in the interior of the manual device the drive shaft is arranged coaxially to the longitudinal axis of the device; the tool is coupled with a driving rod and the latter is coupled with two cranks, each being carried by a crankshaft; the two crankshafts, having a common crank shaft axis which is perpendicular to the longitudinal axis of the device, are borne in bores arranged in the wall of a gear section; the two crank shafts are coupled with the drive shaft by means of a first gear wheel having a rotational axis coinciding with said longitudinal axis of the device and by means of a second gear wheel having a rotational axis coinciding with the crank shaft axis; the two cranks, in the direction of the crank shaft axis, are separated from each other; and the second gear wheel is fixed with the one of the crank shafts.

The method for the manufacture of the above-described manual device is characterized in that in a cylindrical body, in which there have been made an opening and on either side of this opening a bore, the following steps are taken in the order named.

(1) The first gear wheel is inserted through the opening and coupled to the drive shaft;
(2) The second gear wheel together with the one crank shaft, which is fixed to it, is inserted through the opening and into the one bore and the teeth of the two gear wheels are meshed;
(3) The driving or connecting rod provided with the two bearings is inserted through the opening and the one of the bearings is assembled sideways with the crank of the one crank shaft;
(4) The other crank shaft is inserted through the other bore and its crank is assembled with the other bearing of the driving rod;
(5) A cylindrical protective coat is pushed in coaxial direction over the gear part.

The inventive device has the advantages to enable a very precise guidance and a comfortable hold in the hand. The device is particularly handy due to the assemblage, that is, the inventive arrangement of the individual parts of the gearing, as for example, the second gear wheel and its mounting make possible a lightweight and a longitudinal, slim form of small cross section. In addition, the design permits to place the center of gravity in about the center of the device, so that the device is well balanced. The slim form achieved by the invention requires that the gearing parts be relatively small, yet for this reason there results the light weight of the device.

Due to the cylindrical form of the manual device, it can be turned around easily in its longitudinal axis in any desired way. This is especially the case if the cross section of the outer surface is circular. There is a special advantage, if the tool used is a saw or a chisel. In comparison with, for instance, an apparatus having a butt-end of a pistol, the inventive device is much handier. In one of the main applications, namely the application in the field of bone surgery, the easy manageability is of decisive importance.

Inasmuch as the crank shafts are placed in bores of the wall of the gear section, all reactional forces coming from the tool are absorbed by these bores. For this reason the teeth of the gear wheels are free of these forces, so that they will have no damaging influence on the lifetime of these wheels.

The method for the manufacture of the manual device permits a simple and rational assembly thereof and opens the way for a practical manufacture of such an apparatus.

The inventive device is especially suitable for sawing, filing, rasping, chiseling, polishing, brushing, and so on.

BRIEF DESCRIPTION OF THE DRAWINGS

These and other advantages and objects of the invention will become apparent by means of the embodiments shown in the following drawings, in which.

DESCRIPTION OF THE PREFERRED EMBODIMENTS

Figure 1:
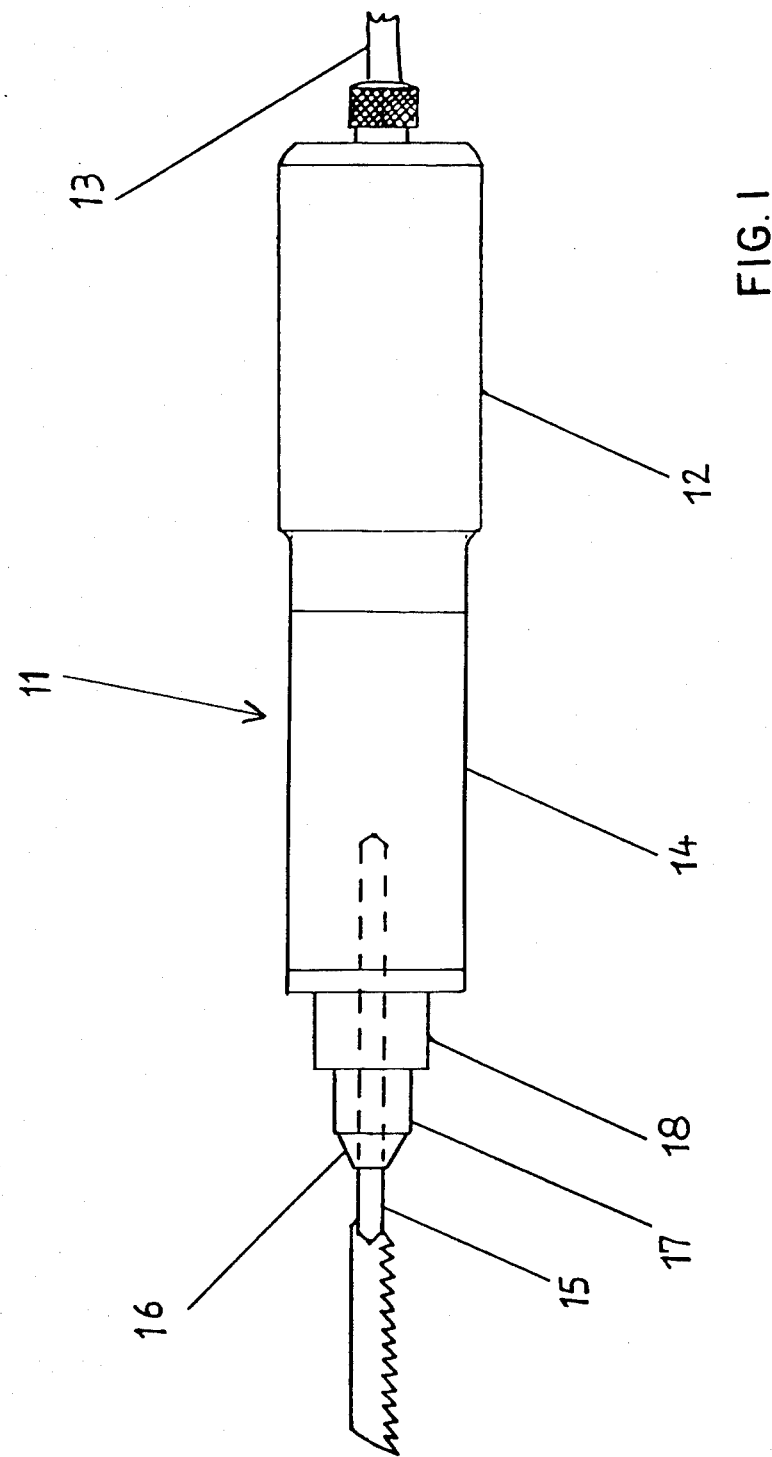
FIG. 1 is a longitudinal plan view of the manual device.

The manual device designated as numeral 11, shown in FIG. 1, has a motor section 12 to which, by means of a cable 13, electrical current can be supplied from a suitable electrical energy source, not shown. The motor of section 12 is preferably a micro motor. The motor is coupled with a gearing or gearing means comprised in a gear section 14. The gearing means serves to drive a tool 15, which, in the example shown, is a saw. The tool, which in the figures is a saw, is fixed by means of a clamping screw or tool holding means 16 to the manual device 11, that is, it is fixed to a push bar or tool holding means 17 driven by the gearing. The push bar 17 is held in a holding cylinder 18. The shaft of the saw can be clamped in any position over its length.

Figure 2:
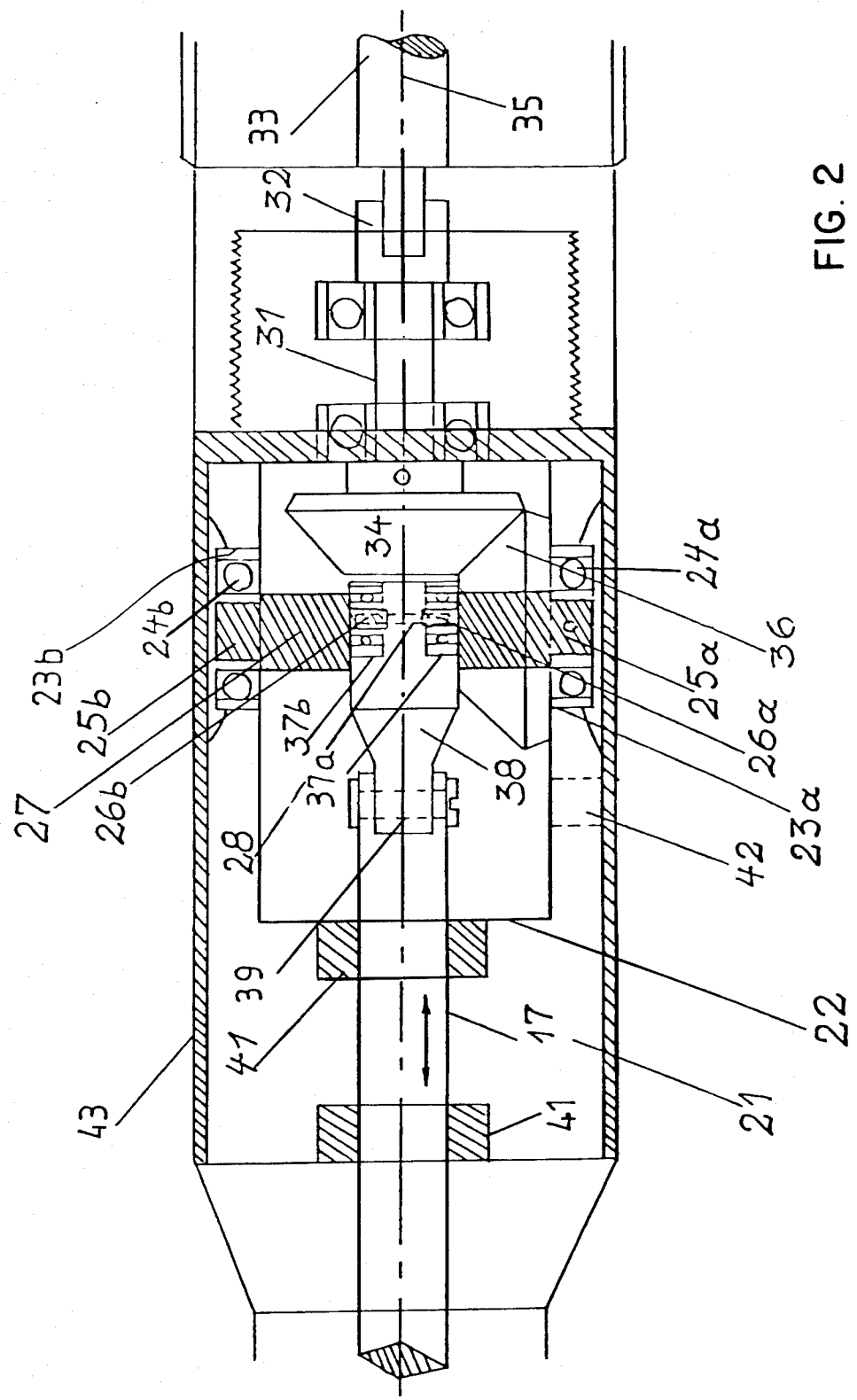
FIG. 2 is a partial cross-sectional view of the assembly of the gear section of the device shown in FIG. 1.

Likewise, FIG. 2 shows the gear section 14 of the manual device 11 as seen from above. The gear section 14 comprises a cylindrical body 21 of preferably circular cross section. This body 21 is provided with an opening 22, which opens upwardly. On both sides of the opening 22 there are provided two lateral bores 23a and 23b, in each of which there is placed one of the rotational bearings 24a, 24b, which may be pinball bearings.

The two bearings 24a, 24b are the external bearings of a link mounted gear train which comprises the two crank shafts 25a and 25b. Each of the latter carries one of the cranks 26a, 26b. These cranks are of circular cylindrical form and each has an axis, which is parallel to the crank shaft axis 27 common to the crank shafts 25a, 25b. The axes of the cranks 26a, 26b are eccentrical with respect to the axis 27.

In a particular embodiment of the manual device 11 as shown, the gearing comprises a peg 28, which is parallel to the axis 27 and inserted into the two cranks 26a and 26b.

The motor section 12 comprises an electrical motor for rotating a shaft 31. This intermediate shaft 31 is connected to a drive shaft 33 of the motor by means of a coupling 32. A first gear wheel provided with teeth and built as a conical gear wheel 34 meshes with a second gear wheel 36, also forming a conical gear wheel. The first conical gear wheel 34 is rotatable around the longitudinal axis 35 of the manual device 11 and the second conical gear wheel 36 is rotatable around the crank shaft axis 27 arranged vertically to the axis 35. The second conical gear wheel 36 is fixed to the crank shaft 25a by means of a peg.

Each of the cranks 26a and 26b is fitted into one of ball bearings 37a, 37b, arranged on a driving or connecting rod 38.

Figure 3:
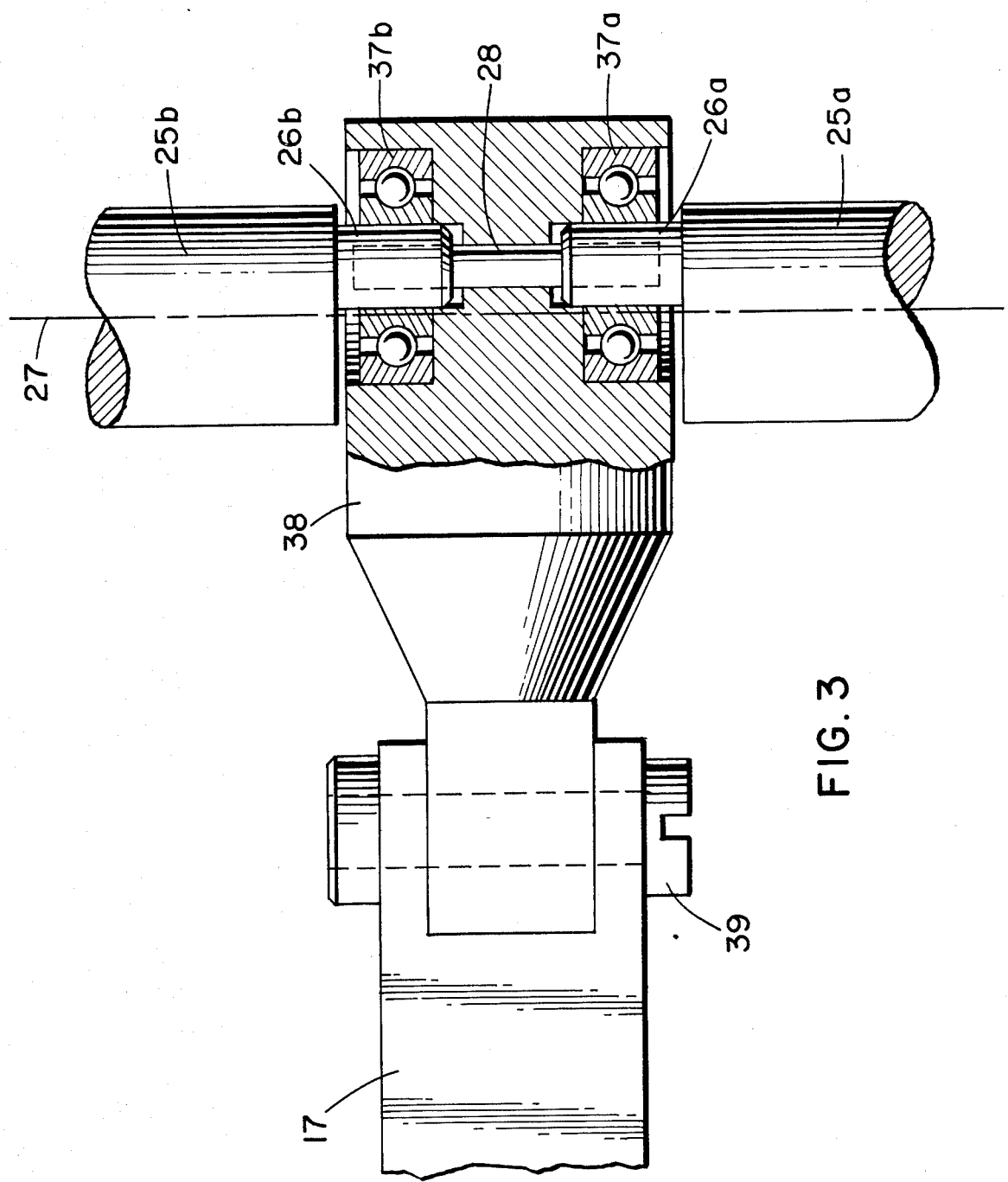
FIG. 3 is a partial view of FIG. 2 showing the connection of cranks fixed to crank shafts forming part of the internal structure of the device.

The cranks 26a and 26b are fixed to the crank shafts 25a and 25b and arranged eccentrically with respect to the axis 27 as shown in FIG. 3, which is the axis of rotation of the shafts 25a and 25b. When the gear wheel 36 rotates, the crank 26a, which is arranged eccentrically to the axis 27, will rotate around axis 27. The crank 26a, on the other hand, is inserted into the ball bearing 37a fixed to the connecting rod 38, thus causing a longitudinal back and forth movement of the push bar 17. The movement of the connecting rod 38, on the other hand, makes the crank 26b, which is coupled with the bearing 37b, fixed to the connecting rod 38, to rotate, so that the crank shaft 25b is also caused to rotate. The coupling of the parts 26a and 26b may be made more rigid by the provision of a peg 28, inserted into bores in the cranks 26a, b and shown in dashed lines. The connecting rod 38 is connected to the push bar 17 in a link joint construction by means of a vice plug 39. The push bar 17 is guided in guides 41 and serves to operate the tool 15. On the same level as the link joint construction, that is in registry therewith, there is provided an opening 42.

The opening 22 is advantageously covered by a plate, not shown in the drawing. An external protective coat 43 serves to protect the gear section 14, to keep the rotational bearings 24a, 24b in place and for holding the manual device 11.

In operation, the drive shaft 33 and the intermediate shaft 31 are rotated around the longitudinal axis 35 of the manual device 11. This rotating movement transfers to the first conical gear wheel 34 which again moves the second conical gear wheel 36. This wheel 36 again, by rotating around the axis 27, causes, via the bearing 37a corresponding to the crank 26a, the connecting rod 38 to move. This causes on the one hand, the push bar 17 and with it the tool 15 to be moved back and forth as shown by the double arrow, and, on the other hand, the crank shaft 25b to rotate.

To avoid a bending of the crank shafts 25a, 25b, in particular the crank shaft 25a and therewith a jamming of the conical wheels 34 and 36 due to the reactionary forces, which react from driving the push bar 17 and the tool 15 back to the crank shaft 25a, the second wheel 36 rests on its bearing 24a, so the reactionary forces are absorbed by the bore 23a. The provision of the crank shaft 25b contributes as an additional support, which adds appreciably to the precise position of the axis 25a. In the case of the embodiment already mentioned, in which the peg 28 is provided, even with the heaviest load on the manual device 11 the crank shaft 25a will not bend. Such a bending must be prevented, so that the conical gear wheels 34 and 36 will at all times mesh precisely and uniformly. Therefrom there results a smooth and noiseless operation of the device and an early wear of the teeth of the wheels 34 and 36 is avoided. If the wheels 34 and 36 are provided with spiral bevel gear teeth, there will result a further noise reduction.

The arrangement as described for transferring the rotational energy of the motor to the tool 15 has the advantage of a minimal space requirement, there resulting a very handy device as already mentioned. Additionally, the arrangement makes it possible to construct the casing in cylindrical form. As is shown in FIG. 1, the cross section of the gear section 14 of the manual device may be even smaller in diameter than the motor section, even if a micro motor is used. This also makes the device handier. The use of a micro motor per se renders the device to be already handier.

As mentioned in the introductory part of the description, in an advantageous embodiment the outer surfaces of the protective coat 43 and of the other sections of the manual device 11 are of circular cross section. The cylindrical protective coat 43 is pushed over the hollow cylinder 21 and fits the latter tightly.

In place of the conical wheels 35, 36 as shown, cylindrical wheels may be used. In place of the gear wheel 34 a piston gear wheel may be used and in place of the gear wheel 36 a crown gear wheel may be used.

In a further embodiment a flexible shaft may serve as a drive shaft 33, which is driven by means of a motor located outside of the manual device 11.

Due to the very small dimensions and the very high precision, which are characteristic for the individual parts, the assemblage is of utmost importance. The following procedure of manufacture is time saving, easy to be performed and thus represents an advantageous way to assemble a structure in a practical manner according to FIG. 2.

On a cylindrical body, which may for instance be of aluminum, there are first made an opening 22 and the two lateral bores 23a and 23b. Thereupon the following steps are taken in the order named:

(1) The first conical wheel 34 is inserted through the opening 22 into the cylindrical body 21 and, according to the circumstances via the intermediate shaft 31, coupled with the drive shaft 33 of the motor;

(2) The second gear wheel 36 is inserted together with the crank shaft 25a fixed with it, through the opening 22 into the interior of the cylindrical body and thereupon pushed from the inside into the bore 23a and the teeth of the gear wheels 34, 36 are meshed;

(3) The connecting rod 38, which comprises the two bearings 37a,37b, is inserted through the opening 22 and its bearing 37a is pushed over the crank 26a, that is, is joined with the crank 26a;

(4) The crank shaft 25b is pushed from the outside through the bore 23b and the crank 26b is fitted into the bearing 37b;

(5) The cylindrical protective coat 43 is pushed over the gearing section 14.

Concerning the sequence of the assemblage, the insertion of the push bar 17 into the guides 41 is to a certain extent optional. The fixing of the push bar 17 to the connecting rod 38 may be done at any time after the parts 17, 38 are in place. In order to fix the vice plug 39, it may be reached with the necessary tools through the opening 22. If, for example, the vice plug 39 comprises a screw connection as shown, a particularly simple way of fastening is to enter with a screw driver through the hole 42.

The push bar 17 advantageously should not be of circular cross section. Inasmuch as it is desired that this bar and the tool 15 fixed to it do not twist and that a strain or load resulting from such twisting force on the parts 24a, 24b, 25a, 25b, 37a, and 37b be avoided, it is advisable to make the cross section of the pushbar 17 rectangular or elliptic, or to provide the bar with a longitudinal groove. In such a case, the guides 41 must correspond to such forms of the bar.

If, as shown in FIG. 2, an intermediate shaft 31 is arranged between the shaft 33 and the first conical gear wheel 34, it is advantageous to have the intermediate shaft 31 built into the device 11 before the step (1). This is generally done in such a way that the shaft 31 is brought into place through the opening 22. It is also possible, however, to separate the parts 12 and 14, for example, to unscrew them and bring the intermediate shaft 31 into place from the right side as shown in FIG. 2.

The rotational bearing 24a can be put into place immediately after the insertion of the crank shaft 25a according to the method step (2). With regard to an advantageous production, however, it is preferable to bring the bearings 24a and 24b into place after the step (4) by inserting them from the outside into the bores 23a and 23b respectively.

If the opening 22 is to be covered by a protection plate, such plate should be put in place between the steps (4) and (5).

The push bar 17 may be attached to the connecting rod 38 at any time between steps (3) and (5). It must, if a protection plate is provided, be done before the plate is put into place. If, however, there is an opening 42, the connection of parts 17 and 38 may also take place after the plate is placed.

Thus, the present invention covers a manual tool device of longitudinal shape and a method for making the same. The manual device is preferably used for surgical operations on bones. The inventive assembly and arrangement, in particular the gearing section by which the driving force of an electrical motor is operatively transmitted to the tool through a gearing means, and the weight of the device provide a well balanced device that is easy to work with in a highly precise manner, and the method to produce the manual device represents a simple and rational way of manufacture.

Although the invention is described in detail for the purpose of illustration, it is to be understood that such detail is solely for that purpose and that variations can be made therein by those skilled in the art without departing from the spirit and scope of the invention except as it may be limited by the claims.

What is claimed is:

1. Manual device for surgical operation on bones, the device of longitudinal shape and an outer surface of cylindrical cross-section adapted to move a tool parallel to the longitudinal axis of the device, an electrical micro motor with a drive shaft and a gear section arranged between the tool and the drive shaft, characterized in that in the interior of the device there is disposed the micro motor and the drive shaft arranged coaxially to the longitudinal axis of the device; that a tool holding means adapted to removably maintain a tool is pivotally coupled with a connecting rod, the latter being pivotally coupled with two cranks, each being carried by a crankshaft and each being of cylindrical form and their axes being parallel and eccentric to a crank shaft axis common to said crankshaft; that the common crank shaft axis is perpendicular to the longitudinal axis of the device; that the crankshafts are borne in bores arranged in a wall of the gear section and on either side of an opening in the wall of said gear section and opposite each other with respect to the longitudinal axis of the device; that the two crank shafts are coupled with the drive shaft by means of a first gear wheel having a rotational axis coinciding with the longitudinal axis of the device and by means of a second gear wheel having a rotational axis coinciding with the crank shaft axis; that the two cranks, in the direction of the crank shaft axis, are separated from each other; that the second gear wheel is fixed with the one of the crank shafts; and that said gear section is covered by a cylindrical protective coat.

2. The device according to claim 1 in which a place is provided for effecting the coupling of the connecting rod with the tool holding means and is in registry with an opening in the cylindrical body, which opening serves as an entrance for a means for operatively coupling the driving rod to the tool holding means.

3. The device according to claim 1 in which the second gear wheel borders on a rotational bearing within one of the bores.

4. The device according to claim 1 in which for the pivotable coupling of the connecting rod with the tool holding means there is provided a push bar guided in guides so arranged that twisting of the push bar around its longitudinal axis is prevented by the shape of the cross section of the push bar and the shape of the guides.

5. In the method for the manufacture of the manual device according to claim 1, characterized in that the following sequence of steps are taken:

(1) The first gear wheel is inserted through the opening and coupled to the drive shaft;

(2) The second gear wheel together with the one crank shaft which is fixed to it is inserted through the opening and into the one bore, and the teeth of the two gear wheels are meshed;

(3) The connecting rod provided with the two bearings is inserted through the opening and the one of the bearings is assembled sideways with the crank of one of the two crank shafts;

(4) The other crank shaft is inserted through the other bore and its crank is assembled with the other bearing of the connecting rod; and (5) A cylindrical protective coat is pushed in coaxial direction over the gear section.

6. The method according to claim 5 in which before the sequence (1) an intermediate shaft is coupled with a drive shaft and in sequence (1) the first gear wheel is connected to the intermediate shaft.

7. The method according to claim 5 in which immediately after sequence (4) the rotational bearings are inserted from the outside into the bores and pushed over the crank shafts.

8. The method according to claim 5 in which between the sequence (4) and (5) the opening is covered by a cover plate.

9. The method according to claim 5 in which between the sequence (4) and (5) the connecting rod is connected to the push bar.

10. The device according to claim 1 in which the tool holding means, guided in said guides, is prevented by the shape of its cross-section from twisting around its axis.

* * * * *